United States Patent [19]

Motegi

[11] Patent Number: 4,988,991

[45] Date of Patent: Jan. 29, 1991

[54] SELECTIVE CALL RECEIVING APPARATUS

[75] Inventor: Takamasa Motegi, Yokohama, Japan

[73] Assignee: Matsushita Electric Industrial Co., Ltd., Osaka, Japan

[21] Appl. No.: 100,314

[22] Filed: Sep. 23, 1987

[30] Foreign Application Priority Data

Sep. 26, 1986 [JP] Japan ................................ 61-229004

[51] Int. Cl.[5] ........................ H04Q 5/00; H04M 11/00

[52] U.S. Cl. ............................ 340/825.5; 340/825.44; 379/57; 455/186

[58] Field of Search ...................... 340/825.44–825.48, 340/311.1, 825.5, 825.51; 455/38, 31, 228, 343, 185, 186; 379/57, 56; 364/900

[56] References Cited

U.S. PATENT DOCUMENTS

| | | | |
|---|---|---|---|
| 4,392,135 | 7/1983 | Ohyagi | 340/825.44 |
| 4,412,217 | 10/1983 | Willard et al. | 340/825.44 |
| 4,477,807 | 10/1984 | Nakajima et al. | 340/825.48 X |
| 4,626,842 | 12/1986 | Ichikawa et al. | 340/825.44 |
| 4,758,834 | 7/1988 | Sato et al. | 340/825.47 |

FOREIGN PATENT DOCUMENTS

| | | | |
|---|---|---|---|
| 2062320 | 5/1981 | United Kingdom | 340/825.44 |
| 2116340 | 9/1983 | United Kingdom | 340/825.44 |
| 2118337 | 10/1983 | United Kingdom | 340/311.1 |
| 2149164 | 6/1985 | United Kingdom | 340/825.44 |

*Primary Examiner*—Ulysses Weldon
*Attorney, Agent, or Firm*—Stevens, Davis, Miller & Mosher

[57] ABSTRACT

A selective call receiving apparatus including a memory. When a new message is to be stored in the memory of which all memory regions have message information stored, the message information for the selective calling number of the lowest priority level of those assigned previously to the all the selective calling numbers, respectively, is erased to thereby allow the incoming message information of less value to be erased earlier.

14 Claims, 6 Drawing Sheets

SELECTIVE CALL RECEIVING APPARATUS

BACKGROUND OF THE INVENTION

The present invention generally relates to a selective call receiving apparatus, such as pager, having a display function.

In general, the selective call receiving apparatus incorporating the display function is so arranged that the message information received from a sender station is once stored in a memory unit for producing a reception alert signal and displaying the received message information.

Reference is made to FIGS. 15 and 16 of the accompanying drawings which illustrate information storage areas in a memory unit employed for storing the incoming message information in the prior art selective call receiving apparatus. The storage area under consideration is assumed to have eight memory locations or regions designated by numerals 21 to 28, respectively.

Referring to FIG. 15, the region 21 is destined to store therein the most recent incoming message information A2, and the region 22 is used to store the next recent incoming message information B4. In the similar manner, regions 23, 24, 25 and 26 stores message information A1, B3, B2 and B1 in the order of incoming sequence. The regions 27 and 28 are not yet occupied with any message information. In FIGS. 15 and 16, reference characters A and B represent the message information received for every selective calling signal and the affixed numerals 1, . . . , 4 indicate the order in which the associated incoming message signals have been received for every selective calling signal.

FIG. 16 is a view for illustrating how the new incoming message information B5 is stored starting from the storage state illustrated in FIG. 15. As will be seen, the new incoming message information B5 is stored in the location or region 21, while the information A2, B4, A1, B3, B2 and B1 stored till then in the regions 21, 22, 23, 24, 25 and 26, respectively, are transferred to the regions 22, 23, 24, 25, 26 and 27, respectively.

FIG. 17 of the accompanying drawings shows the state of the memory unit in which all the regions 21 to 28 have the message information stored therein. When new incoming message A4 is received in the storage state illustrated in FIG. 17, the new incoming signal A4 is stored in the region 21 as shown in FIG. 18, while the information stored in the regions 21 to 27 is transferred sequentially to the subsequent regions 22 to 28, respectively, wherein the oldest information B1 stored till then in the region 28 is erased.

In the prior art memory system of the arrangement in which the message information is stored simply in the incoming sequence of the selective calling signals, as described above, the incoming message information even of a significant value is undesirably erased at an earlier time point, when a new incoming message is stored in the aforementioned memory unit of the state in which all the memory locations or regions have been occupied with the incoming message information stored therein, thus giving rise to a problem.

SUMMARY OF THE INVENTION

Accordingly, it is an object of the present invention to provide a selective call receiving apparatus in which the storage and management of the incoming message information can be optimized by allowing the incoming message information of the least value of those stored in the memory unit to be erased when a new incoming message is to be stored.

In view of the above object, there is provided according to an aspect of the present invention a selective call receiving apparatus in which when a new incoming message is to be stored in a memory unit of which all memory regions are occupied with the incoming message information stored therein, the incoming message information associated with the selective calling number allotted with a low priority level is erased in accordance with the priority rules established previously for every selective calling number.

Because the priority levels are previously established for every selective calling number according to the teaching of the invention, it is now possible to erase the incoming message information of less value when new incoming message information is to be stored in the memory unit whose memory regions are all occupied with the incoming message information stored therein.

DESCRIPTION OF THE PREFERRED EMBODIMENTS

Figure 1:
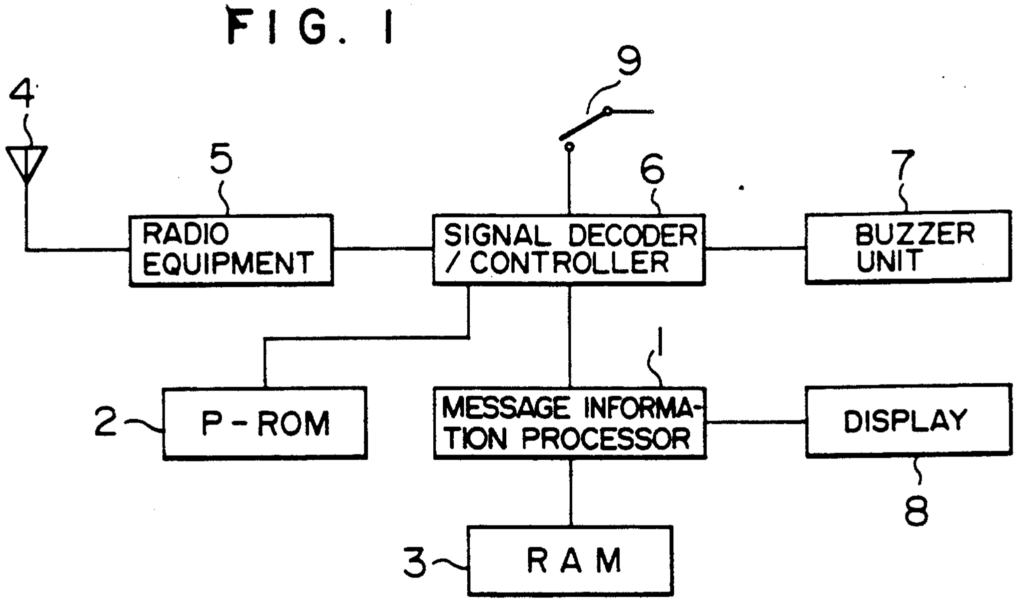
FIG. 1 is a view showing in a block diagram a general arrangement of a selective call receiving apparatus equipped with a display function according to an exemplary embodiment of the present invention.

In the following, exemplary embodiments of the present invention will be described by first referring to FIGS. 1 to 14 in which FIG. 1 is a block diagram showing schematically an arrangement of the selective call receiving apparatus, such as pager, with display function according to an embodiment of the invention, and FIGS. 2 to 14 are views for illustrating structures of information storage areas which can be realized in a RAM employed in the apparatus shown in FIG. 1.

Referring to FIG. 1, the selective call receiving apparatus includes a message information processing unit (hereinafter referred to as CPU in abbreviation) 1, a programmable read only memory (hereinafter referred to as P-ROM) 2 which stores therein inter-call selective calling numbers, priority levels of incoming message information and data for selectively enabling erasing means, a random access memory (hereinafter referred to as RAM) 3 storing the incoming message information, radio equipment 5 for demodulating the modulated signals received by means of antenna 4, a signal decoder/controller 6 for decoding the signals (e.g. inter-call selective calling number signals and others) supplied from the radio equipment 5 to compare for identification the decoded signal with the inter-call selective calling number read out from the P-ROM 2, a buzzer circuit 7 for alerting of the reception of message information by generating an alarm, a display unit 8 for displaying the incoming message information stored in the RAM 3, and a switch 9 for recalling the RAM 3.

With the system of the arrangement outlined above, the modulated signal transmitted from a sender station is received by the antenna 4, to be subsequently demodulated by the radio equipment 5, the output signal of which undergoes discriminative comparison with the inter-call selective calling number read out from the P-ROM 2 in the signal decoder/controller 6.

When the received and decoded signal is decided to be associated with the selective calling number, the CPU 1 performs the processing for storing the incoming message information in the RAM 3 in the manner described hereinafter. Upon completion of the reception, the buzzer circuit 7 and the display unit 8 generate a reception alert message and a display of the information, respectively.

When the switch 9 for controlling the recall operation is actuated, the controller 6 detects the actuation and issues a recall activating signal to the CPU 1, which in turn reads out the incoming message information from the RAM 3 and supplies the information to the display unit 8.

Next, description will be made of the storage of the incoming message information in the RAM 3 by referring to FIGS. 2 to 4.

The RAM 3 includes memory locations or regions 21 to 28 for storing the information of eight incoming messages, respectively. Throughout FIGS. 2 to 4, reference characters A and B designate the incoming message information for two selective calling signals, respectively, and affixed numerals indicate the incoming order of the information for every selective calling signal.

In conjunction with the processing for storing the incoming message information, there are established three priority (preference) levels. More specifically, the incoming message information A1, A2 and so forth for the selective calling number (or code) A is allotted with higher priority level (referred to first type of priority level) than the incoming message information B1, B2 and so forth for the selective calling number B. Of the incoming messages for the same selective calling number, new incoming message information is allotted with higher priority level (referred to as second type of priority level) than the old message information. Further, when new incoming message information is to be stored in the RAM 3 in the state where all the storage regions 21 to 28 are occupied, the numbers of the incoming message information stored in the RAM for every selective calling number are compared with each other and the incoming message information greater in number is assigned with higher priority level (referred to as the third type of priority level) for the erasure. These priority levels as well as programs to be executed by the CPU 1 in accordance with the priority levels are stored previously in the P-ROM 2. Operation of the CPU 1 based on the execution program will be described below.

Figure 2:
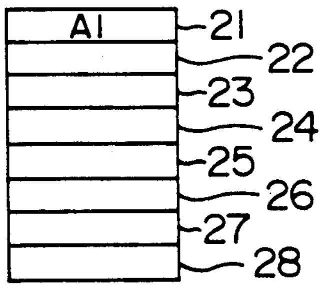
FIGS. 2 to 9, 11 to 13 are views for illustrating, respectively, structures of information storage areas in a RAM (random access memory) of the apparatus shown in FIG. 1.

Referring to FIG. 2, the region 21 is an area destined to store the most recent incoming message information. In the case of the illustrated state, information A1 is stored. The other regions 22 to 28 are not yet occupied by any information.

Figure 3:
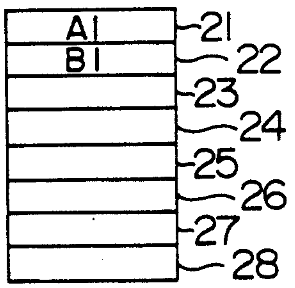

FIG. 3 illustrates a situation in which new incoming message information B1 is received in the storage state shown in FIG. 2. In this case, the information B1 is stored in the region 22 of the lower rank than that of the information A1 although the former is the most recent information at this time point. This is because the incoming message information B1 for the selective call number B is assigned with a priority level lower than that of the information A1 for the selective calling number A (first type of priority level).

Figure 4:
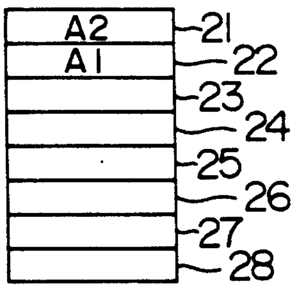

In the case of the situation illustrated in FIG. 4, it is assumed that new incoming message information A2 is received in the memory state shown in FIG. 2. The new incoming information A2 is stored in the region 21 with the information A1 occupied the region 21 till then is moved to the region 22. This is because the message information for one and the same selective calling number is assigned with each priority level determined in accordance with the incoming order (second type of priority level).

Figure 5:
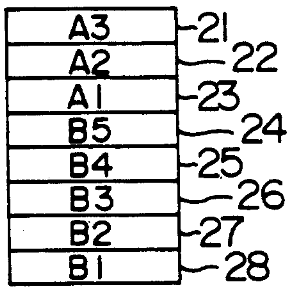
Figure 6:
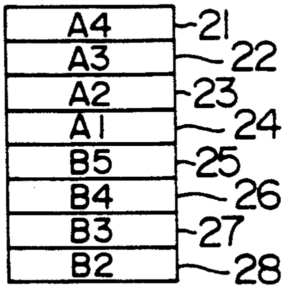

FIG. 5 shows the memory state in which all the regions 21 to 28 have been loaded with the incoming messages up to the full storage capacity of the RAM 3 through the procedures similar to those described above in conjunction with FIGS. 3 and 4. FIG. 6 is a view illustrating the state in which the new incoming message information A4 for the selective calling number having higher priority (first type priority level) than the information for the calling number B is stored starting from the state shown in FIG. 5. At that time, the message information B1 for the selective calling number B having lower priority level is erased. In this connection, it should be noted that the priority is also assigned to the erasure of the incoming message information in accordance with the incoming order for the same selective calling number B. Namely, the oldest information B1 of those stored for the calling number B is erased (second type priority rule). In this manner, according to the illustrated embodiment, erasure of the message information is executed in dependence on the combination of selection by the selective calling number (selection based on the first type of priority rule) and selection by the incoming order for the same calling number (selection based on the second type of priority rule).

Next, description will be made of the third type of priority level.

In the state shown in FIG. 5, the number of the message information stored for the calling number A is "3" while that for the calling number B is "5". Accordingly, when the message information A4 is stored, the oldest information B1 for the calling number B having a larger number of the stored message (i.e. "5" in the state shown in FIG. 5) is erased, as shown in FIG. 5. Thus, the information A3 to A1 and B5 to B2 is moved from the regions 21 to 27 to the regions 22 to 28, respectively, with the new coming message information A4 being stored in the region 21.

Figure 7:
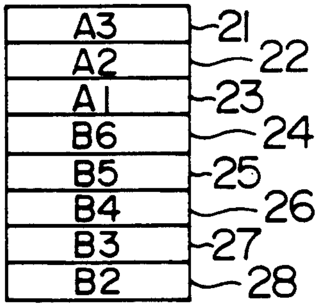
Figure 8:
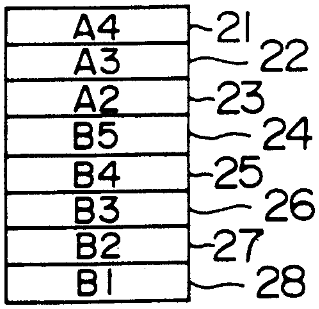

FIG. 7 shows the state in which the new incoming message information B6 for the calling number B is stored starting from the state shown in FIG. 5. As with the case of the new incoming message A4 described above, the oldest information B1 for the calling number B for which the number of the information is greater than the calling number A is erased. The information B5 to B2 in the regions 24 to 27 are moved to the regions 25 to 28, whereby the new incoming message information B6 is stored in the region 24.

As will be understood from the foregoing, when a new incoming message is to be stored in the RAM 3 having all the memory regions 21 to 28 loaded with the message information, the number of the incoming message information stored in the RAM 3 is counted for each of the selective calling numbers, and the oldest stored incoming message information belonging to the selective calling number having a greater number of the message information stored is erased.

Parenthetically, determination as to the number of the message information stored for the selective calling numbers A and B may be made on the basis of the decision as to which of the calling numbers A or B the information stored in the intermediate region 24 or 25 belongs to, instead of counting the number of the stored information for each of the selective calling numbers A and B.

Next, description will be made of the fourth type of priority level selection rule according to which the number of the information to be stored is previously established. It is now assumed that the numbers of information to be stored for the selective calling numbers A and B are previously set at the values of ratio weighted with "1" and "3", respectively, in the P-ROM 2. On the assumption, when new incoming message information A4 is received in the state shown in FIG. 5 where the number of information for the calling number A is "3" while that for the calling number B is "5", the oldest information A1 for the calling number A is erased because the number of the message information stored for the calling number A is greater than the preset ratio value, resulting in the storage state shown in FIG. 8. In this case, the second priority level procedure that the oldest information A1 of those stored for the calling number A is erased is also adopted.

Figure 9:
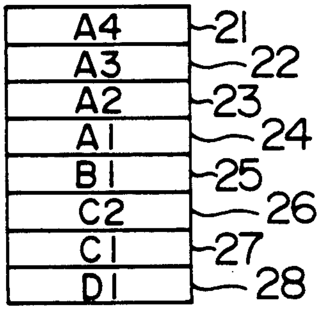
Figure 10:
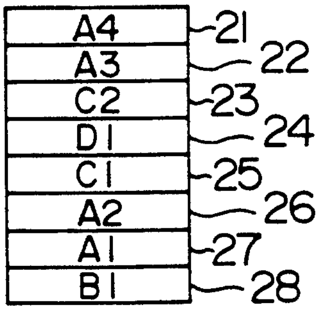
FIG. 10 PRIOR ART
FIGS. 10, 14, 15 to 18 are views showing the structures of information memory areas in a RAM employed in the prior art selective call receiving apparatus.
Figure 19A:
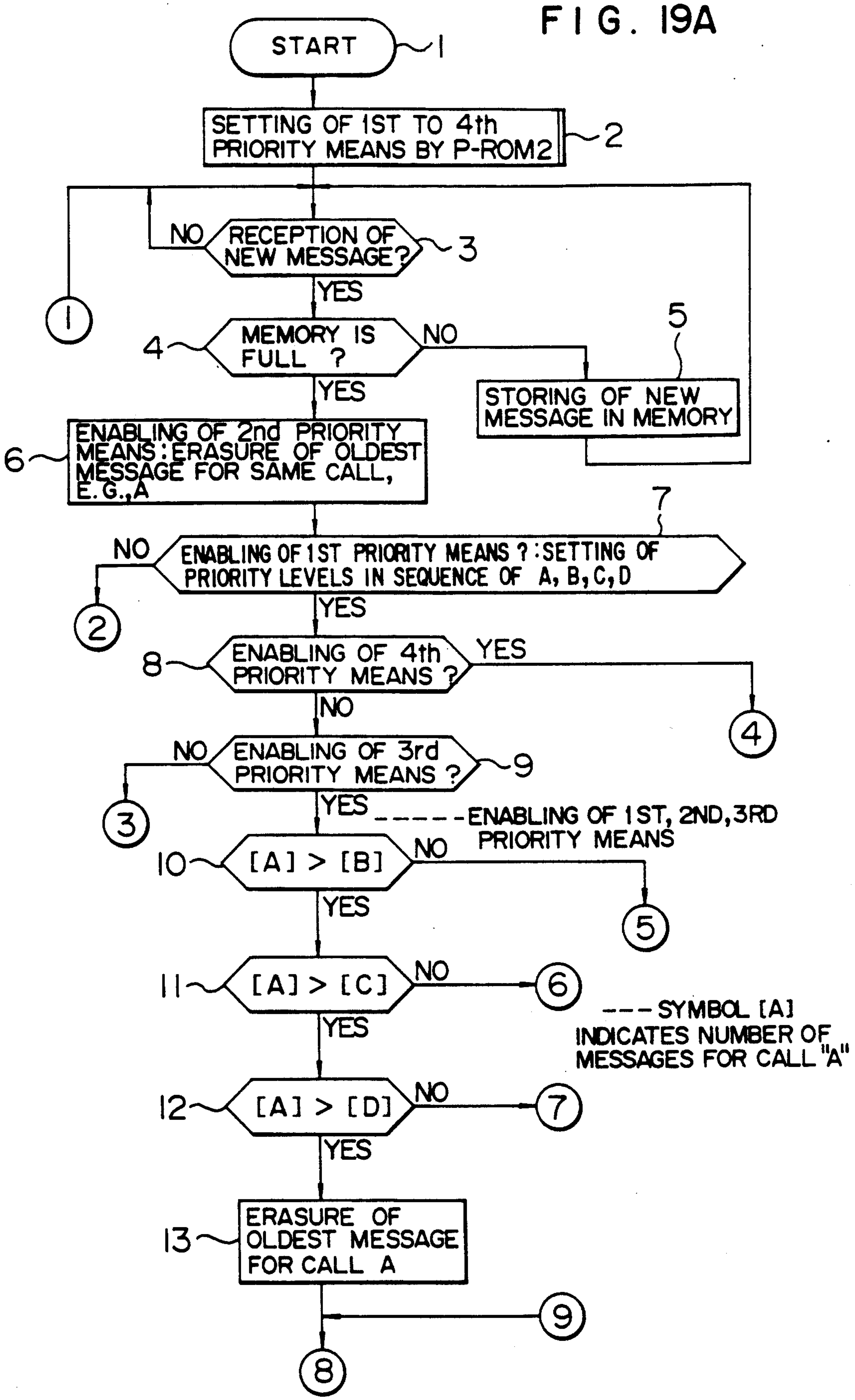
FIG. 19A, 19B and 19C form a flow chart for illustrating operations in conjunction with FIGS. 9 to 14.
Figure 19B:
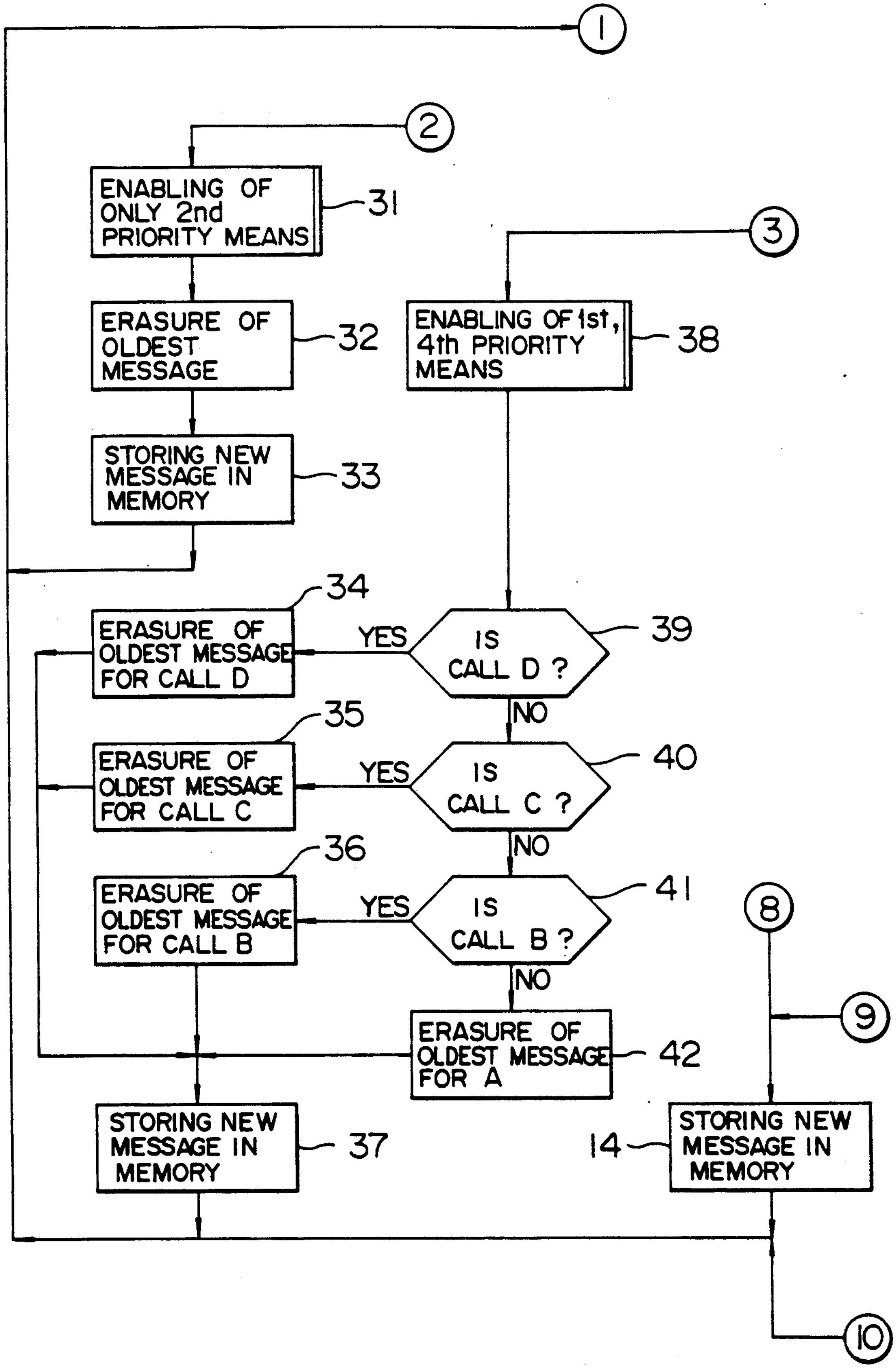
Figure 19C:
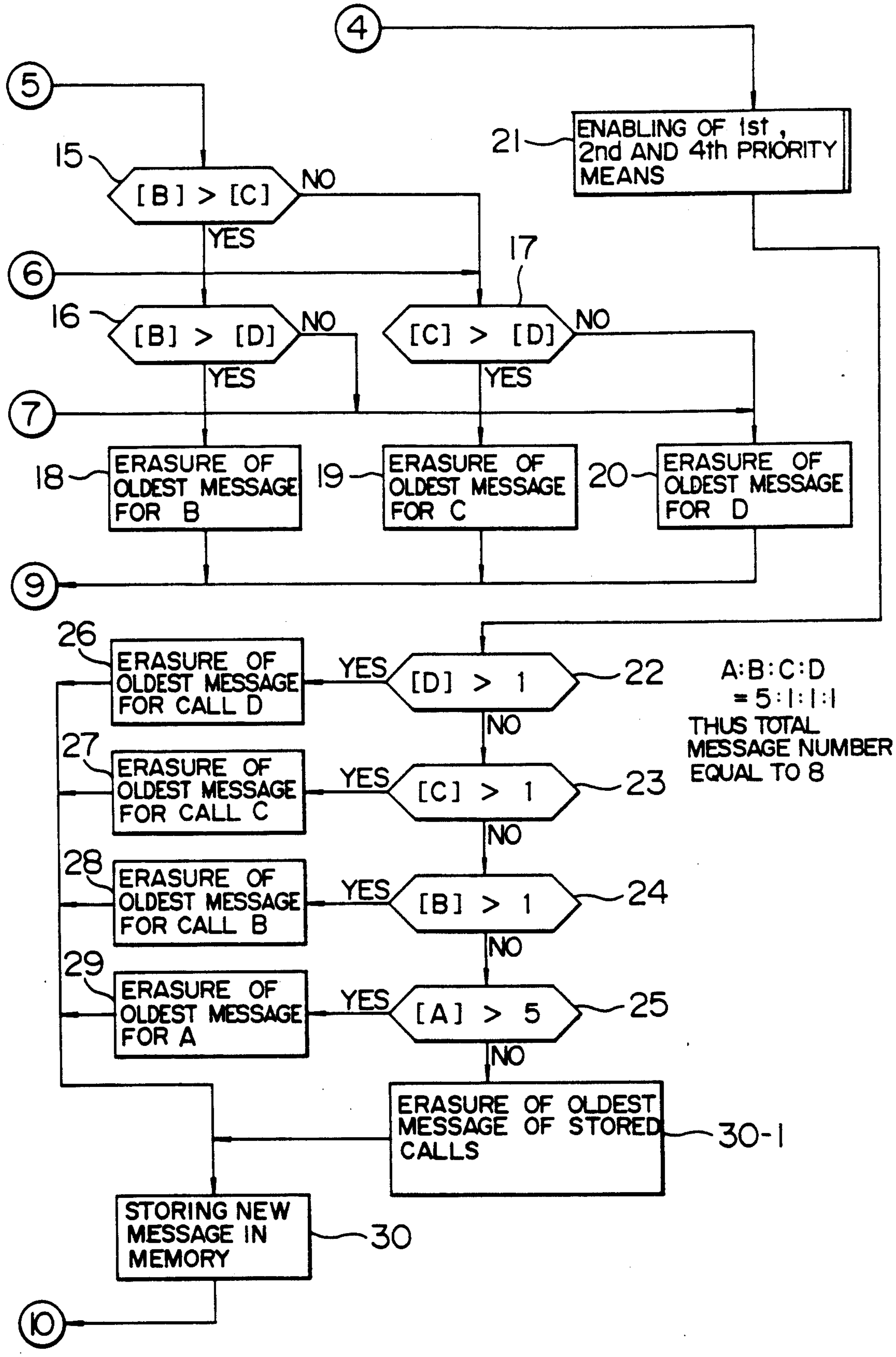

FIG. 19 is a flow chart for above operations. Now, referring to FIGS. 9 to 14 and 19A, 19B, 19C description will be directed to an exemplary case in which the information erased in accordance with the combinations of the first to fourth type of priority levels or rules varies widely on the assumption that four selective calling numbers A, B, C and D are used and assigned with the priority of high to low levels in this order in accordance with the first priority level allocation, the storage ratio values for the message information are preset at "1", "1", "1" and "5" for the calling numbers A, B, C and D, respectively, in accordance with the fourth type of priority level, and that the RAM 3 includes eight memory locations 21 to 28 at which the message information B1, A1, A2, C1, D1, C2, A3 and A4 received in this order are stored, respectively. FIG. 9 shows the storage state resulting from the application of the first, second and fourth type of priority level rules, while FIG. 10 shows the storage state established through the prior art procedure.

As shown in FIG. 19A, the priority scheme is set in a step 2 at the beginning of operations by data stored in PROM 2. As the message informations B1, A1, A2, C1, D1, C2, A3 and A4 are sequentially received the system tests for a full memory for each message reception in step 4 and in the absence of a full memory the received message information in stored in step 5, providing the memory allocation shown in FIG. 9.

Figure 11:
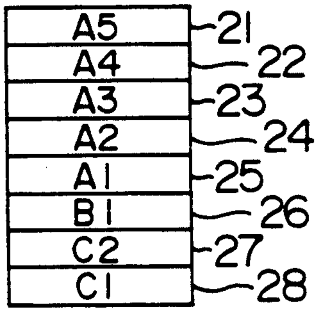

When new message information A5 is received in the state shown in FIG. 9, the information D1 of the lowest priority level is erased in accordance with the first priority rule, resulting in the storage state illustrated in FIG. 11.

Figure 12:
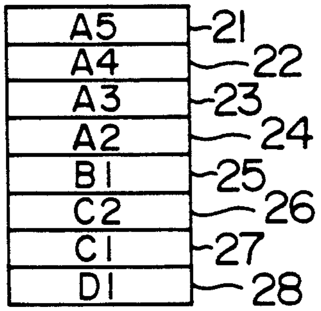

When the third priority level rule is applied, the oldest information A1 for the calling number A having the greatest number of information stored is erased, whereby the storage state such as shown in FIG. 12 is resulted.

Figure 13:
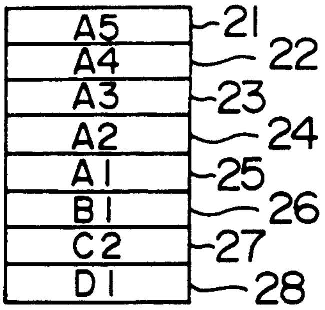

When the fourth priority level rule is applied, the oldest information C1 for the calling number C which has a greater number of stored information in view of the preestablished storage ratio of A:B:C:D=1:1:1:5 is erased, resulting in the storage state shown in FIG. 13.

The selection of which priority rules are applied is made in step 2 by the PROM stored data (FIG. 19A). If the first, second and fourth priority level rules are selected, the system proceeds from step 4 (FIG. 19A) for a new message information through steps 6, 7 and 8 (FIG. 19A) and then to steps 21, 22, 23, 24, 25, 26, 27, 28, 29, 30, 30-1 (FIG. 19B) whereby these priority level rules are applied.

If only the second priority level rule is selected, the system proceeds from step 4 to steps 6, 7 (FIG. 19A) to steps 31, 32 and 33 (FIG. 19B) to apply this rule.

If only the first and second priority rules are selected, the system proceeds from step 4 to steps 6, 7, 8, 9 (FIG. 19A) and then to steps 38, 39, 40, 41, 42, 34, 35, 36, 37 (FIG. 19B) to implement the first and second priority level rules.

If the first, second and third priority level rules are selected, the system proceeds from step 4 through steps 6, 7, 8 and 9 (FIG. 19A) to steps 10, 11, 12, 13 (FIG. 19A) and in conjunction therewith steps 15, 16, 17, 18, 19, 20 (FIG. 19C) to execute the first second and third priority level rules.

Figure 14:
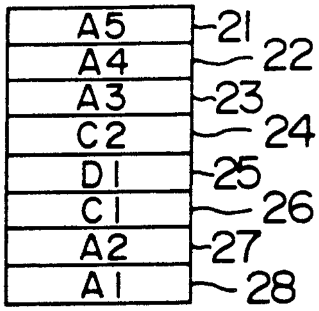
FIG. 14 PRIOR ART
Figure 15:
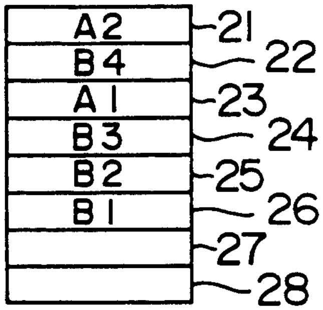
FIG. 15 PRIOR ART
Figure 16:
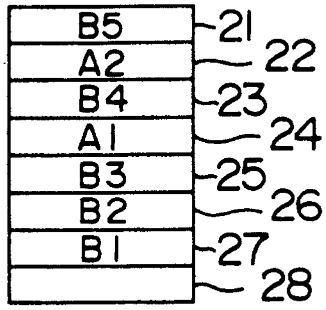
FIG. 16 PRIOR ART
Figure 17:
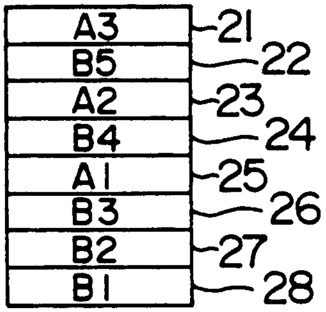
FIG. 17 PRIOR ART
Figure 18:
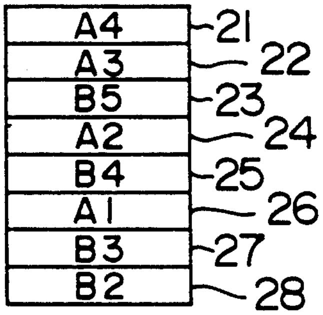
FIG. 18 PRIOR ART

In contrast, to the invention according to the hitherto known procedure, the oldest information B1 in the region 28 is simply erased, as shown in FIG. 14.

As will be readily understood from the comparison of the storage states shown in FIGS. 13 and 14, the present invention allows the information of less value to be erased earlier with the information of great value being stored by virtue of the storage and erasure in accordance with the predetermined priority level rules (FIG. 13), providing thus a great advantage over the hitherto known procedure according to which the information is stored simply in the order of reception (FIG. 14).

As will be appreciated from the foregoing description, the information storage and management in the RAM 3 can be optimized according to the invention by erasing earlier the message information of less value upon storage of the new incoming message information according to the priority levels selected in accordance with actual application from the first to fourth priority rules preestablished in the P-ROM 2.

I claim:

1. A selective call receiving apparatus comprising:

receiving means for receiving incoming messages for each of at least two different selective calling numbers;

first memory means for storing incoming messages received from said receiving means for each of said at least two different selective calling numbers, said first storing means having a capacity for storing a predetermined number of messages;

second memory means for storing data representing an erasing priority for erasing a message of lower priority stored in said first memory means as compared to other messages stored in said first memory means when a new incoming message is received by said receiving means and is to be stored in said first memory means when said first memory means is at its full storage capacity;

erasure means for erasing, in accordance with the erasing priority data stored in said second memory means, a lower priority message stored in said first memory means when a new incoming message is received by said receiving means and is to be stored in said first memory means and said first memory means is at its full storage capacity, said erasure means including:

first means defining a priority ranking for said at least two selective calling numbers and erasing a stored message for one of said at least two selective calling numbers of the lowest priority in said ranking;

said first means of said erasure means selectively operating under control of said stored erasing priority data, wherein said erasure means further includes third means for comparing the number of messages stored in said memory means for each of said at least two selective calling numbers with one another and erasing a message for that selective calling number having the greatest number of messages stored in said first memory means, said third means of said erasure means selectively operating under control of said stored erasing priority data.

2. A selective call receiving apparatus comprising:

receiving means for receiving incoming messages for each of at least two different selective calling numbers;

first memory means for storing incoming messages received from said receiving means for each of said at least two different selective calling numbers, said first storing means having a capacity for storing a predetermined number of messages;

second memory means for storing data representing an erasing priority for erasing a message of lower priority stored in said first memory means as compared to other messages stored in said first memory means when a new incoming message is received by said receiving means and is to be stored in said first memory means when said first memory means is at its full storage capacity;

erasure means for erasing, in accordance with the erasing priority data stored in said second memory means, a lower priority message stored in said first memory means when a new incoming message is received by said receiving means and is to be stored in said first memory means and said first memory means is at its full storage capacity, said erasure means including:

first means defining a priority ranking for said at least two selective calling numbers and erasing a stored message for one of said at least two selective calling numbers of the lowest priority in said ranking;

said first means of said erasure means selectively operating under control of said stored erasing priority data, wherein said erasure means further includes fourth means for comparing the number of messages stored in said first memory means for each of said at least two selective calling numbers with respective associated values weighted previously in a predetermined ratio and erasing a stored message for that selective calling number having a greater number of messages stored than its associated value, said fourth means of said erasure means selectively operating under control of said stored erasing priority data.

3. A selective call receiving apparatus comprising:

receiving means for receiving incoming messages for each of at least two different selective calling numbers;

first memory means for storing incoming messages received from said receiving means for each of said at least two different selective calling numbers, said first storing means having a capacity for storing a predetermined number of messages;

second memory means for storing data representing an erasing priority for erasing a message of lower priority stored in said first memory means as compared to other messages stored in said first memory means when a new incoming message is received by said receiving means and is to be stored in said first memory means when said first memory means is at its full storage capacity;

erasure means for erasing, in accordance with the erasing priority data stored in said second memory means, a lower priority message stored in said first memory means when a new incoming message is received by said receiving means and is to be stored in said first memory means and said first memory means is at its full storage capacity, said erasure means including:

first means defining a priority ranking for said at least two selective calling numbers and erasing a stored message for one of said at least two selective calling numbers of the lowest priority in said ranking;

said first means of said erasure means selectively operating under control of said stored erasing priority data.

4. An apparatus according to claim 3, wherein said erasure means further includes second means for erasing the oldest message of those stored in said first memory means for the same one of said at least two selective calling numbers, said second means of said erasure means selectively operating under control of said stored erasing priority data.

5. A selective call receiving apparatus according to claim 3, wherein said first memory means stores the incoming messages in accordance with priority levels of said at least two selective calling numbers, respectively.

6. A selective call receiving apparatus according to claim 5, wherein said priority levels are assigned to the selective calling numbers, respectively.

7. A selective call receiving apparatus according to claim 5, wherein said priority levels are sequenced in the order in which the incoming message is received for each of said at least two selective calling numbers.

8. A selective call receiving apparatus comprising:

receiving means for receiving incoming messages for each of at least two different selective calling numbers;

first memory means for storing incoming messages received from said receiving means for each of said at least two different selective calling numbers, said first memory means having a capacity for storing a predetermined number of messages;

means for erasing, in accordance with an erasing priority, messages stored in said first memory means when said first memory means is filled to its capacity and an incoming message is received by said receiving means, said erasing priority causing erasure of messages from said first memory means on a priority basis having at least one priority rule for causing erasure (i) other than by a time of arrival sequence of incoming messages and (ii) by a priority based on a predetermined differentiation between said at least two different selective calling numbers and another priority rule for causing erasure by a time of arrival sequence of incoming messages, whereby said erasing priority is determined by a combination of said at least one priority rule and said another priority rule.

9. A selective call receiving apparatus as in claim 8 wherein said erasing priority establishes at least one priority rule in which the oldest received message of a selective calling member of a currently received message is erased first.

10. A selective call receiving apparatus comprising:

means for receiving incoming messages for each of at least two different selective calling numbers;

first memory means for storing incoming messages for each of said at least two different selective calling numbers, said first storing means having a capacity for storing a predetermined number of messages;

second memory means for storing data representing an erasing priority for erasing a message of lower priority stored in said first memory means as compared to other messages stored in said first memory means when a new incoming message is to be stored in said first memory means and said first memory means is at its full storage capacity;

erasure means for erasing, in accordance with the erasing priority data stored in said second memory means, a lower priority message stored in said first memory means when a new incoming message is to be stored in said first memory means and said first means is at its full storage capacity, said erasure means including:

first means defining a priority ranking for said at least two selective calling numbers and erasing a stored message for one of said at least two selective calling numbers of the lowest priority in said ranking; and third means for comparing the numbers of messages stored in said memory means for each selective calling number with one another and erasing a stored message for that selective calling number which has the greatest number of messages stored in said first memory means;

said first and third means of said erasure means selectively operating under control of said stored erasing priority data.

11. A selective call receiving apparatus comprising:

means for receiving incoming messages for each of at least two different selective calling members;

first memory means for storing incoming messages for each of said at least two different selective calling numbers, said first storing means having a capacity for storing a predetermined number of messages;

second memory means for storing data representing an erasing priority for erasing a message of lower priority stored in said first memory means as compared to other messages stored in said first memory means when a new incoming message is to be stored in said first memory means and said first memory means is at its full storage capacity;

erasure means for erasing, in accordance with the erasing priority data stored in said second memory means, a lower priority message stored in said first memory means when a new incoming message is to be stored in said first memory means and said first memory means is at its full storage capacity, said erasure means including:

first means defining a priority ranking for said at least two selective calling numbers and erasing a stored message for one of said at least two selective calling numbers of the lowest priority in said ranking;

second means for erasing the oldest message of those stored in said first memory means for a same one of said at least two selective calling numbers;

third means for comparing the number of messages stored in said first memory means for each selective calling number with one another and erasing the stored message for one of said at least two selective calling numbers for which the greatest number of messages is stored in said memory means; and fourth means for comparing the number of messages stored in said first memory means for each of said at least two selective calling numbers with respective associated values weighted previously in a predetermined ratio and erasing a stored message for that selective calling number which has a greater number of messages stored than its associated value;

said first, second, third and fourth means of said erasure means selectively operating under control of said stored erasing priority data.

12. A selective call receiving apparatus comprising:

receiving means for receiving incoming messages for each of at least two different selective calling numbers;

first memory means for storing incoming messages received from said receiving means for each of said at least two different selective calling numbers, said first memory means having a capacity for storing a predetermined number of messages;

means for erasing, in accordance with an erasing priority, messages stored in said first memory means when said first memory means is filled to said capacity and an incoming message is received by said receiving means, said erasing priority causing erasure of messages from said first memory means on a priority basis having at least one priority rule for causing erasure other than by a time of arrival sequence of incoming messages and another priority rule for causing erasure by a time of arrival sequence of incoming messages, whereby said erasing priority is determined by a combination of said at least one priority rule and said another priority rule, wherein said erasing priority causes erasure of messages from said first memory means such that:

(a) said at least one priority rule is a first priority rule established among the selective calling numbers so that all stored messages of a lower priority selective calling number are erased before erasure of any messages of a higher priority selective calling number; and (b) said another priority rule is a second priority rule established for each of said selective calling numbers so that the oldest received message of a selective calling number is erased first.

13. A selective call receiving apparatus comprising:

receiving means for receiving incoming messages for each of at least two different selective calling numbers;

first memory means for storing incoming message received from said receiving means for each of said at least two different selective calling numbers, said first memory means having a capacity for storing a predetermined number of messages;

means for erasing, in accordance with an erasing priority, messages stored in said first memory means when said first memory means is filled to said capacity and an incoming message is received by said receiving means, said erasing priority causing erasure of messages from said first memory means on a priority basis having at least one priority rule for causing erasure other than by a time of arrival sequence of incoming messages and another priority rule for causing erasure by a time of arrival sequence of incoming messages, whereby said erasing priority is determined by a combination of said at least one priority rule and said another priority rule, wherein said erasing priority causes erasure of messages from said first memory means such that:

(a) said at least one priority rule is a first priority rule established among the selective calling numbers so that those selective calling numbers having a higher number of messages stored in said first memory means have their messages erased before messages of a selective calling number having a lower number of messages stored in said first memory are erased; and (b) said another priority rule is a second priority rule established for each of said selective calling numbers so that the oldest received message of a selective calling number is erased first.

14. A selective call receiving apparatus comprising:

receiving means for receiving incoming messages for each of at least two different selective calling numbers;

first memory means for storing incoming message received from said receiving means for each of said at least two different selective calling numbers, said first memory means having a capacity for storing a predetermined number of messages;

means for erasing, in accordance with an erasing priority, messages stored in said first memory means when said first memory means is filled to said capacity and an incoming message is received by said receiving means, said erasing priority causing erasure of messages from said first memory means on a priority basis having at least one priority rule for causing erasure other than by a time of arrival sequence of incoming messages and another priority rule for causing erasure by a time of arrival sequence of incoming messages, whereby said erasing priority is determined by a combination of said at least one priority rule and said another priority rule, wherein said erasing priority causes erasure of messages from said first memory means such that:

(a) said at least one priority rule is a first priority rule established such that a stored message ratio is provided among the selective calling numbers for messages stored in said first memory means and those selective calling numbers having a number of messages stored in said first memory means which exceeds their assigned ratio are erased before any stored messages of selective calling numbers which do not exceed their assigned ration are erased; and (b) said another priority rule is a second priority rule established for each of said selective calling numbers so that the oldest received message of a selective calling number is erased first.

* * * * *